United States Patent [19]
Sporn

[11] Patent Number: 5,934,224
[45] Date of Patent: Aug. 10, 1999

[54] LEASH-CONTROLLABLE DOG HARNESS FORMED BY CONTINUOUS LOOP

[76] Inventor: Joseph S. Sporn, 274 W. 86th St., New York, N.Y. 10024

[21] Appl. No.: 09/215,931

[22] Filed: Dec. 18, 1998

[51] Int. Cl.[6] .................................................. A01K 27/00
[52] U.S. Cl. ............................................................ 119/792
[58] Field of Search ................................... 119/769, 771, 119/792, 795, 797, 798

[56] References Cited

U.S. PATENT DOCUMENTS

| | | | |
|---|---|---|---|
| 5,660,146 | 8/1997 | Sporn | 119/792 |
| 5,682,840 | 11/1997 | McFarland | 119/856 |
| 5,713,308 | 2/1998 | Holt, Jr. | 119/856 |

*Primary Examiner*—Thomas Price
*Attorney, Agent, or Firm*—Michael Ebert

[57] ABSTRACT

A leash-controllable, collarless dog harness adapted to inhibit a dog from straining against the leash. The harness is formed from a cable having a pair of branches which are joined together at their opposing ends to form a continuous loop, a coupling ring encircling one end. The other end of the branches extends through a buckle to create an eyelet through which the ring passes. Slidable along the branches to clamp them together is a lockable clamp, and also slidable thereon to space the branches apart is a spacer element. When the harness is installed, the clamp is then positioned to overlie the shoulder of the dog and the buckle is positioned to overlie the body of the dog, the spacer element then being placed adjacent the dog's chest, whereby the branches of the cable run from the ring through the eyelet to the clamp at the shoulder of the dog, and from there down opposite sides of the dog to pass through the left and right foreleg crotches and then up the body of the dog to terminate at the eyelet.

9 Claims, 2 Drawing Sheets

LEASH-CONTROLLABLE DOG HARNESS FORMED BY CONTINUOUS LOOP

BACKGROUND OF INVENTION

1. Field of Invention

This invention relates generally to a collarless dog harness which is connected to a leash held by an individual walking the dog, and more particularly, to a controllable dog harness and leash assembly adapted to inhibit the dog from straining against the leash and inducing the dog to come to a halt or to walk at a pace acceptable to the leash holder.

2. Status of Prior Art

A leash is a chain or strap attached to the collar or harness of a dog, the leash being used to lead the dog or to hold it in check.

As pointed out in the Bloom U.S. Pat. No. 2,233,397, when a dog strains against a leash attached to a dog harness, it is important that the harness then avoid a choking effect on the throat of the dog, or undue pressure on throat muscles, cords and nerves, for these may have adverse effects on the lungs and heart of the dog. While Bloom discloses a non-choking harness, this harness does not act to discourage the dog from straining against the leash. Indeed, because the harness is non-choking, there is nothing to inhibit such straining and to hold the dog in check.

The need exists, therefore, for a harness to break older dogs of the habit of straining at the leash and for training younger dogs not to strain at the leash. A dog when straining at the leash, may in doing so wrest the leash from the hands of its master who then loses control. But this is a less objectionable aspect of straining, for in the case of a master of advanced years or in a relatively weakened condition, should the master hold tightly onto the strained leash to maintain control of the dog, the master may then be pulled to the ground or otherwise upset, with possibly damaging consequences.

My prior Sporn U.S. Pat. No. 4,964,369, discloses a dog harness acting to inhibit the dog from straining against the leash without, however, producing a choking action. The harness comprises a collar encircling the neck of the dog, and left and right restraint cables whose leading ends are connected to the front section of the collar. The restraint cables go loosely under the left and right foreleg pits of the dog and through respective slip rings attached to the rear section of the collar, the trailing ends of the cables terminating in a coupler to which the leash is attached.

When the harnessed dog strains at the leash, this acts to tighten the restraint cables which then impose a pressure on the foreleg pits. Because these pits are highly sensitive, in order to relieve this pressure the dog will then cease to strain against the leash and thereby again loosen the restraint cable. A harness of the type disclosed in my prior U.S. Pat. No. '369 is effective for its intended purpose, but it requires a collar whose size is appropriate to the neck size of the dog on which it is installed.

My prior Sporn U.S. Pat. Nos. 5,359,964, 5,329,885 and 5,676,093 all disclose a collarless, leash-controllable dog harness adapted to inhibit a dog from straining against the leash held by an individual walking the dog, the harness inducing the dog to come to a halt or to walk at a pace acceptable to the leash holder.

In this collarless harness, the straps and cables which form the harness run between a shoulder junction overlying the shoulder of the dog and a chest junction lying adjacent the chest. When this harness is installed on a dog, one harness strap passes through the right foreleg crotch, the other strap passing through the left foreleg crotch. Should the harnessed dog strain against the leash, this causes both straps to ride up the respective crotches to impose pressure on the highly-sensitive foreleg pits. In order to relieve the resultant discomfort, the dog then slows down or comes to a halt to relax the strain.

The collarless harnesses disclosed in my U.S. Pat. Nos. 5,359,964, 6,329,885 and 5,673,093 have distinct advantages over the harness disclosed in my prior U.S. Pat. No. '369, for it does not entail a collar. But in both instances, control of the dog is effected by applying pressure to the highly-sensitive foreleg pits to induce the dog to relax the strain on the leash.

However collarless harnesses disclosed in my prior patents are somewhat complex structurally for they include fabric straps, metal junction-plates, releasable buckles, tri-slides and other components which are required to accommodate the harness to the geometry of the dog on which the harness is to be installed.

Hence these prior collarless harnesses, though highly effective in controlling a dog, are relatively costly to manufacture. Moreover, these harnesses call for some degree of skill to install properly, a skill that may be lacking in some dog owners.

Of prior art interest is the Everson U.S. Pat. No. 2,187,021 in which a dog harness is composed of a neck collar loop whose lines extend through the foreleg crotches of the dog to join a body loop to which a leash is coupled, the leash when strained acting to tighten the collar loop about the neck of the dog and force down the head of the dog. Also of prior art interest is the U.S. Pat. No. 5,682,840 to McFarland in which a restraining device for a dog formed by a pair of cords of equal length form loops to apply pressure to the foreleg pits of the dog.

SUMMARY OF INVENTION

In view of the foregoing, the main object of this invention is to provide a leash-controllable, collarless harness of relatively simple and inexpensive design adapted to apply pressure to the highly sensitive foreleg pits of the harnessed dog, thereby inhibiting the dog from taking any action not acceptable to the holder of the leash.

More particularly, an object of this invention is to provide a harness of the above type formed by a continuous cable that is transformed into a harness by inexpensive components, such as a lockable clamp.

A significant advantage of a collarless harness in accordance with the invention is that it can readily be adjusted to fit on a dog of any size, the installation procedure requiring little skill.

Briefly stated, these objects are attained by a leash-controllable, collarless dog harness adapted to inhibit a dog from straining against the leash. The harness is formed from a cable having a pair of branches which are joined together at their opposing ends to form a continuous loop, a coupling ring encircling one end. The other end of the branches extends through a buckle to create an eyelet through which can be passed the branches carrying the ring.

Slidable along the branches to hold them together is a lockable clamp, and also slidable thereon to space the branches apart is a spacer element. When the harness is installed, the clamp is then positioned to overlie the shoulder of the dog and the buckle is positioned to overlie the body of the dog, the spacer element then being placed adjacent the dog's chest, whereby the branches of the cable then run from the ring through the eyelet to the clamp at the shoulder of the dog, and from there down opposite sides of the dog to pass through the left and right foreleg crotches and then up the body of the dog to terminate at the eyelet through which the ring passes to join the leash.

When the leash is strained to pull on the harness, this causes the branches of the cable to ride up the foreleg crotches to engage and press against the sensitive foreleg pits. The dog, in order to relieve this pressure, is induced to slow down or come to a halt.

BRIEF DESCRIPTION OF DRAWING

For a better understanding of the invention, as well as further features thereof, reference is made to the detailed description thereof to be read in connection with the annexed drawings wherein.

DESCRIPTION OF INVENTION

Figure 1:
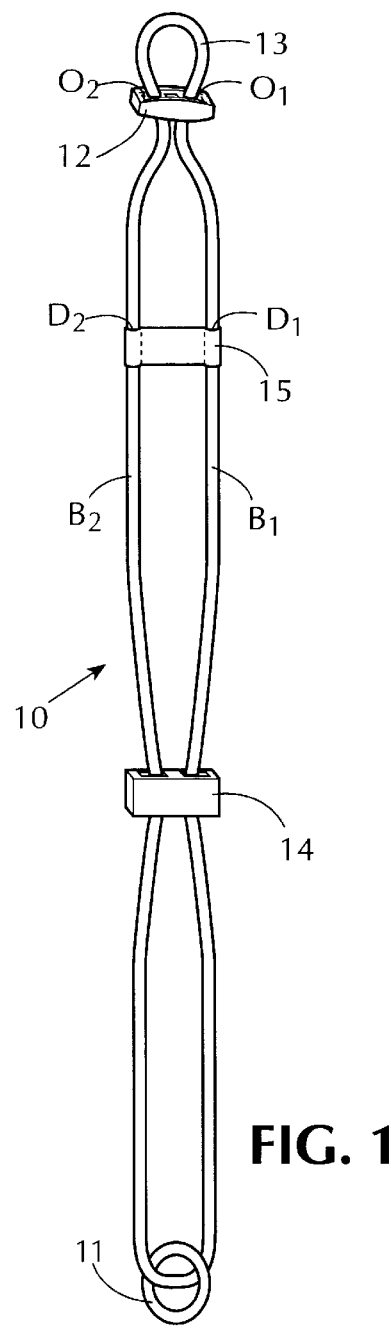
FIG. 1 illustrates the continuous cable which is transformable into a collarless harness in accordance with the invention.
Figure 7:
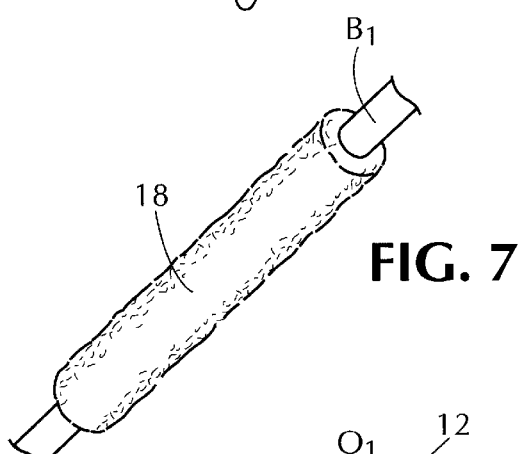
FIG. 7 illustrates a protective sleeve which is mounted on one branch of the harness.

Referring now to FIG. 1, shown therein is a continuous cable 10 from which a harness in accordance with the invention is created. The continuous cable may be formed of fabric material, such as nylon, or it may be made of flexible plastic material or of leather.

The continuous cable may be created from a single length of cabling that is folded in half to form two like branches $B_1$ and $B_2$. The branches are joined together at their ends to form an endless loop.

Figure 5:
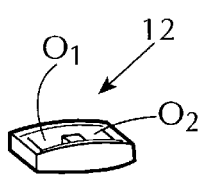
FIG. 5 is a separate view of the buckle included in the harness.

Encircling the branches at one end thereof is a metal ring 11. At the other end, branches $B_1$ and $B_2$ pass through the parallel slots $O_1$ and $O_2$ of a plastic buckle 12 (shown separately in FIG. 5). The joined together branches at this end create an eyelet 13 extending from the buckle whose eye is large enough to permit ring 11 to pass therethrough.

Slidable along branches $B_1$ and $B_2$ is a lockable clamp 14 which acts to clamp the branches together at a position determined by the clamp setting when it is locked. A commercially available push-button operated lockable clamp may be used for this purpose.

Figure 6:
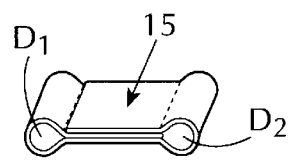
FIG. 6 separately shows the spacer element included on the harness.

Intermediate clamp 14 and buckle 12 and slidable along branches $B_1$ and $B_2$ is a spacer element 15. As shown separately in FIG. 6, spacer element 15 which may be formed of fabric or plastic material is provided with parallel ducts $D_1$ and $D_2$ through which the cable branches pass. Spacer element 15 which keeps the cables apart, is shiftable along the branches between buckle 12 which holds the branches close together and clamp 14 which clamps the branches together.

Figure 4:
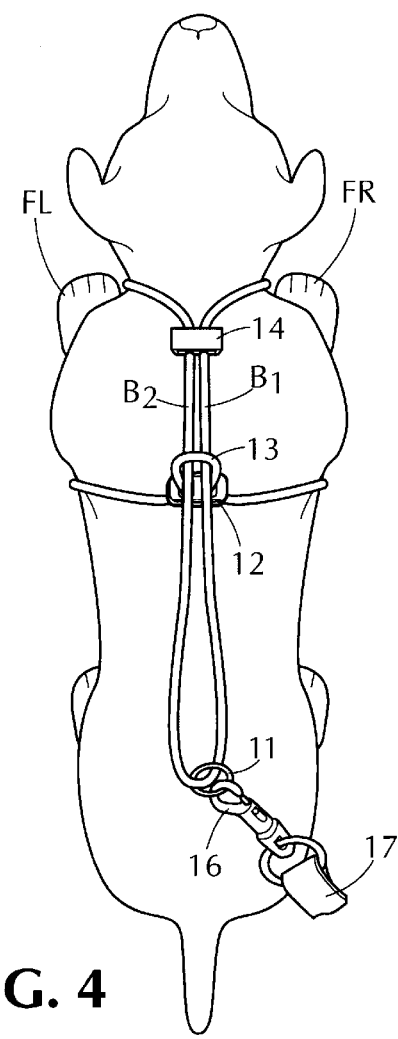
FIG. 4 shows the harness, as seen from the top of the dog.
Figure 2:
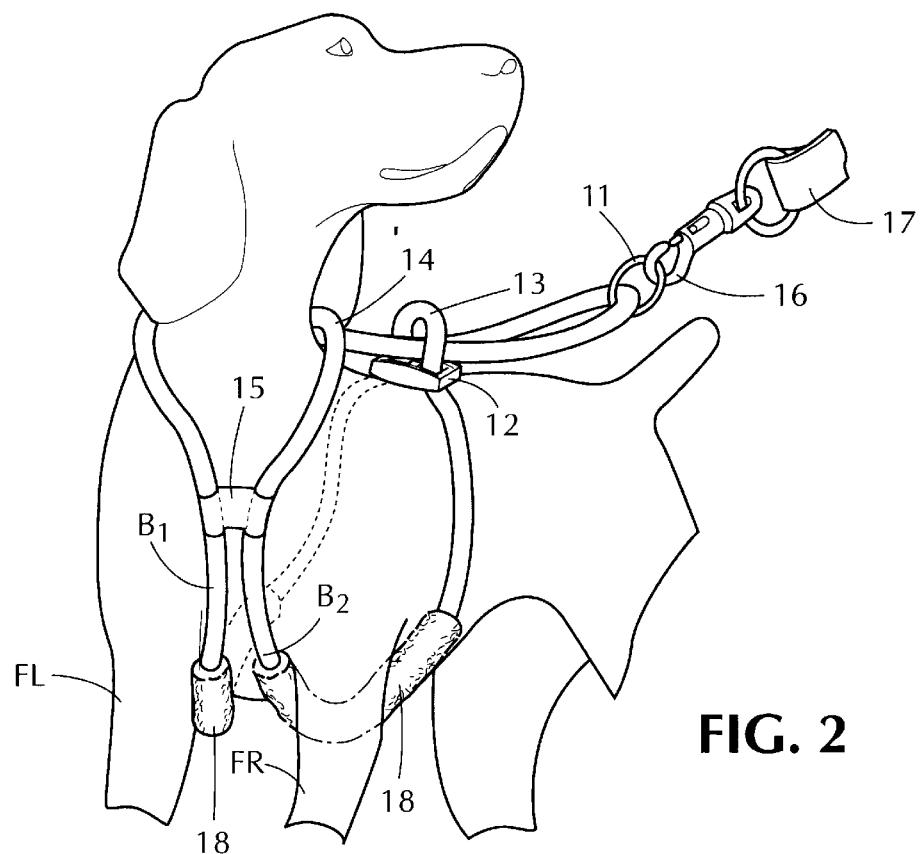
FIG. 2 shows a dog having the harness installed thereon, as seen from the front end of the dog.
Figure 3:
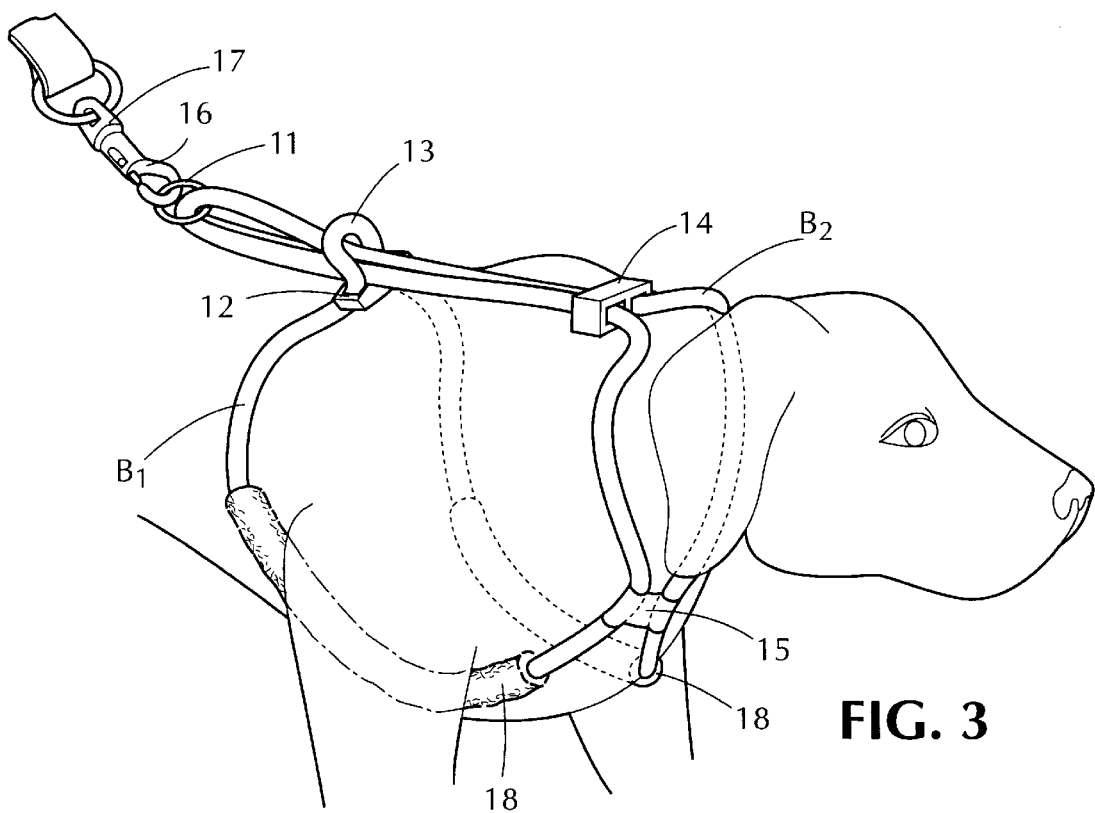
FIG. 3 shows the same harness, as seen from one side of the dog.

As illustrated in FIGS. 2, 3 and 4, when cable 10 which forms a continuous loop is installed on dog D to create a collarless harness, clamp 14 is then positioned along the branches so that it overlies the shoulder of the dog below its neck, midway between the right foreleg RF and the left foreleg FL of the dog. Buckle 12, from which eyelet 13 projects, is positioned to overlie the body of the dog, while spacer element 15 is placed adjacent the chest of the dog. Obviously, the respective positions of buckle 12, spacer element 15 and clamp 14 must be adjusted by the installer to accommodate the geometry of the dog on which the harness is installed.

Ring 11 which passes through eyelet 13 is engaged by the snap-connector 16 of a leash 17, as shown in FIG. 4. In order therefore to be able to unharness the dog, one must first decouple the leash from the ring.

The harness arrangement is such that branches $B_1$ and $B_2$ run from ring 11 at one end of the harness through eyelet 13 projecting above buckle 12 on the body of the dog, and from eyelet 13 to clamp 14 overlying the shoulder of the dog. From clamp 14, branches $B_1$ and $B_2$ separate to go down opposite sides of the dog and then pass through the left and right foreleg crotches, as shown in FIG. 2.

From the foreleg crotches, branches $B_1$ and $B_2$ of cable 10 then go up the body of the dog to terminate in eyelet 13 through which is threaded the ring end of the branches.

When therefore dog D, by lurching ahead, puts a strain on leash 17 coupled to ring 11 of the harness, the resultant pull on branches $B_1$ and $B_2$ causes these branches to ride up the foreleg crotches to engage and press against the sensitive foreleg pits of the dog. In order to relieve this pressure, the dog reacts by slowing down or coming to a halt, thereby relieving the strain on the leash and causing the branches to loosen and disengage from the foreleg pits.

Because ring 11 at one end of the branches of the harness passes through eyelet 13 which is effectively anchored on the body of the dog, the orientation of the harness on the dog is maintained regardless of the angle of the leash, with respect to the harness. Hence a strain on the leash regardless of how it is angled with respect to the dog, always acts to properly activate the harness.

Another advantage of passing the leash coupling ring 11 through the eyelet 13 anchored on the body of the dog is that this serves to latch the harness to the dog. If the end of the branches carrying the coupling ring were free from the body of the dog, the dog could then escape from the harness.

The branches of the harness which pass through the right and left foreleg crotches rub against the surface of the dog when the branches are tightened. With continued use of the harness, this action may cause irritation or chafing.

To avoid such chafing without however interfering with the ability of the harness to control the dog, there is preferably mounted on each branch of the harness an elongated protective sleeve 18. Sleeve 18 which is disclosed in greater detail in Sporn U.S. Pat. No. 5,485,810, has a tubular inner liner of woven or knitted nylon, on which is anchored a soft coat of Sherpa or cashmere wool. When the cable branch carrying sleeve 18 is tightened because the leash is strained, sleeve 18 does not shift axially. However the cable branch within sleeve 18 slides along the smooth surface of the inner liner, and as it is tightened, the branch causes the sleeve to ride up the foreleg crotch to engage the foreleg pit to apply pressure thereto. But because the sleeve engaging the pit is soft and is not shifted axially, no chafing takes place. The use of protective sleeves is optional, for the cable from which the harness is made may be formed of fabric cord material having a soft, non-abrasive outer pile.

A harness in accordance with the invention is of simple and inexpensive design, yet is highly effective in controlling the dog on which it is installed. While there has been shown and described a preferred embodiment of a leash-controllable dog harness formed by a continuous cable, it will be appreciated that many changes and modifications may be made therein without, however, departing from the essential spirit thereof.

Thus instead of a spacer element which is slidable on the branches of the harness to keep them apart, use may be made of a slider which brings the branches closer together. The spacer element is appropriate for large dogs having a sizable chest region, while the slider is useful for smaller dogs.

And instead of a harness in which the branches carrying the ring is free to slide in the eyelet to cause the branches to ride up the foreleg crotches when the leash coupled to the ring is strained, the ring may be fixedly joined to the eyelet or to the buckle. In that case, when the leash is strained, the entire harness is tightened to cause the branches to ride up the foreleg crotches to engage the foreleg pits end also to tighten the harness about the body of the dog.

I claim:

1. A collarless harness for a dog having right and left foreleg crotches that lead to foreleg pits and a shoulder below the neck of the dog intermediate the forelegs, in combination with a leash coupled to the harness which is adapted to inhibit the dog from straining against the leash, said harness comprising:

A. a cable formed by a pair of branches joined together at their ends to create a continuous loop;
   B. a coupling ring encircling one end of the branches;
   C. a buckle adjacent the other end of the branches through which the branches pass to create an eyelet projecting from the buckle, said eyelet having an eye which permits the branches carrying the ring at said one end of the branches to thread therethrough so that it can be coupled to the leash;
   D. a lockable clamp slidable on the branches between the ring and the buckle to clamp them together at a selected position whereby when the harness is installed on the dog, the clamp is then positioned to overlie the shoulder of the dog, and the buckle is then positioned to overlie the body of the dog rearwardly of the shoulder to cause the eyelet to project above the body, the branches of the cable then running from the ring through the eyelet to the clamp at the shoulder of the dog, from which the branches run down opposite sides of the dog to pass through the left and right foreleg crotches and then up the body of the dog to terminate at the eyelet through which the ring passes to join the leash, whereby a pull on the leash causes the branches to ride up the foreleg crotches to engage and press against the sensitive foreleg pits to inhibit the dog from straining against the leash.

2. A harness as set forth in claim 1, in which the cable is formed of fabric material.

3. A harness as set forth in claim 1, in which the buckle is molded of plastic and is provided with parallel slots through which the branches extend.

4. A harness as set forth in claim 1, in which the clamp is lockable to maintain its set position on the branches.

5. A harness as set forth in claim 1, further including a spacer element slidable on branches to space the branches apart, said spacer element being positioned adjacent the chest of the dog.

6. A harness as set forth in claim 1, further including a protective sleeve mounted on each branch to prevent chafing of the dog.

7. A harness as set forth in claim 6, in which the sleeve has a soft outer coat.

8. A harness as set forth in claim 7, in which the outer coat is Sherpa wool.

9. A harness as set forth in claim 1, in which the continuous loop is formed by a length of cable that is folded in half to create a pair of branches whose ends are joined together.

\* \* \* \* \*